US005864850A

United States Patent [19]

Nordman

[11] Patent Number: 5,864,850
[45] Date of Patent: Jan. 26, 1999

[54] ASYNCHRONOUS-EVENT OPENING COMPONENT OF A NETWORK COMPONENT SYSTEM

[75] Inventor: Michael M. Nordman, Palo Alto, Calif.

[73] Assignee: Apple Computer, Inc., Cupertino, Calif.

[21] Appl. No.: 806,484

[22] Filed: Feb. 27, 1997

[51] Int. Cl.[6] ................................................ G06F 17/30
[52] U.S. Cl. ...................... 707/10; 707/103; 395/184.01; 395/200.5; 395/200.34; 395/200.35; 395/200.71
[58] Field of Search ................ 707/10, 103; 395/184.01, 395/200.5, 200.34, 200.35, 200.71; 711/100, 119; 342/25

[56] References Cited

U.S. PATENT DOCUMENTS

| | | | |
|---|---|---|---|
| 5,584,035 | 12/1996 | Duggan et al. | 395/800 |
| 5,617,539 | 4/1997 | Ludwig | 395/200.34 |
| 5,666,293 | 9/1997 | Metz | 395/200.5 |
| 5,689,641 | 11/1997 | Ludwig | 395/200.71 |
| 5,724,506 | 3/1998 | Cleron et al. | 395/200.01 |
| 5,751,961 | 5/1998 | Smyk | 395/200.47 |
| 5,752,246 | 5/1998 | Rogers et al. | 707/10 |
| 5,758,079 | 5/1998 | Ludwig | 395/200.34 |
| 5,764,886 | 6/1998 | Danielson | 395/184.01 |

OTHER PUBLICATIONS

MacWeek, Nov. 7, 1994, vol. 8, No. 44, "Cyberdog to Fetch Internet Resources for Opendoc Apps", R. Hess.
Opinion, MacWeek, Nov. 14, 1994, The Second Decade, "Cyberdog Could be a Breakthrough if It's Kept on a Leash", H. Norr.

Apple Computer, Inc., "*Cyberdog Programmer's Kit*", 1996.

Feiler, Jesse, "Cyberdog—The Complete Guide to Apple's Internet Productivity Technology", AP Professional, 1996, U.S.A., pp. iv–xviii, 284–285, 288–289, 296–298, 310–312, 345–347.

Apple Computer, Inc., "Cyberdog Programmer's Kit", Addison–Wesley Publishing Co., 1996, U.S.A., pp. 2–8, 32–33, 45–50, 53–59, 68–83, 241–242, 256–261, and 269–276.

*Primary Examiner*—Thomas G. Black
*Assistant Examiner*—Diane D. Mizvahi
*Attorney, Agent, or Firm*—Cesari and McKenna, LLP

[57] ABSTRACT

An opening part of an extensible and replaceable network-oriented component system opens asynchronous information by maintaining a placeholder until an actual data type determination is made. While this placeholder is being maintained, the progress of the opening process may be monitored and displayed. Upon determining the actual data type of the asynchronous information, the appropriate display part for the data type may be obtained. The network-oriented system includes a novel application programming interface for the opening part that facilitates integration with an underlying software component architecture. Such a highly-modular cooperating layered-arrangement between the network component system and the component architecture allows the opening part to be replaced, extended or modified by other opening-type components, while ensuring that these latter components "seamlessly" interact with existing components and component editors of the system.

26 Claims, 9 Drawing Sheets

ASYNCHRONOUS-EVENT OPENING COMPONENT OF A NETWORK COMPONENT SYSTEM

CROSS-REFERENCE TO RELATED APPLICATIONS

This invention is related to the following copending U.S. Patent Applications:

Abandoned U.S. patent application Ser. No. 08/435,862, titled REPLACEABLE AND EXTENSIBLE LOG COMPONENT OF A NETWORK COMPONENT SYSTEM;

Pending U.S. patent application Ser. No. 08/435,377, titled EXTENSIBLE, REPLACEABLE NETWORK COMPONENT SYSTEM;

Abandoned U.S. patent application Ser. No. 08/435,374, titled REPLACEABLE AND EXTENSIBLE NOTEBOOK COMPONENT OF A NETWORK COMPONENT SYSTEM;

U.S. patent application Ser. No. 08/435,213 now U.S. Pat. No. 5,724,506, titled REPLACEABLE AND EXTENSIBLE CONNECTION DIALOG COMPONENT OF A NETWORK COMPONENT SYSTEM;

U.S. patent application Ser. No. 08/435,671 now U.S. Pat. No. 5,781,189, titled EMBEDDING INTERNET BROWSER/BUTTONS WITHIN COMPONENTS OF A NETWORK COMPONENT SYSTEM;

Abandoned U.S. patent application Ser. No. 08/435,880, titled ENCAPSULATED NETWORK ENTITY REFERENCE OF A NETWORK COMPONENT SYSTEM, each of which was filed on May 5, 1995 and assigned to the assignee of the present invention; and Pending U.S. patent application Ser. No. 08/806,483, entitled REPLACEABLE AND EXTENSIBLE NAVIGATOR COMPONENT OF A NETWORK COMPONENT SYSTEM, which was filed on Feb. 27, 1997 and assigned to the assignee of the present invention.

FIELD OF THE INVENTION

This invention relates generally to computer networks and, more particularly, to an architecture and tools for asynchronous-event opening for Internet-specific services of a network component based system.

BACKGROUND OF THE INVENTION

The Internet is a system of geographically distributed computer networks interconnected by computers executing networking protocols that allow users to interact and share information over the networks. Because of such wide-spread information sharing, the Internet has generally evolved into an "open" system for which developers can design software for performing specialized operations, or services, essentially without restriction. These services are typically implemented in accordance with a client/server architecture, wherein the clients, e.g., personal computers or workstations, are responsible for interacting with the users and the servers are computers configured to perform the services as directed by the clients.

Not surprisingly, each of the services available over the Internet is generally defined by its own networking protocol. A protocol is a set of rules governing the format and meaning of messages or "packets" exchanged over the networks. By implementing services in accordance with the protocols, computers cooperate to perform various operations, or similar operations in various ways, for users wishing to "interact" with the networks. The services typically range from browsing or searching for information having a particular data format using a particular protocol to actually acquiring information of a different format in accordance with a different protocol.

For example, the file transfer protocol (FTP) service facilitates the transfer and sharing of files across the Internet. The Telnet service allows users to log onto computers coupled to the networks, while the netnews protocol provides a bulletin-board service to its subscribers. Furthermore, the various data formats of the information available on the Internet include JPEG images, MPEG movies and $\mu$-law sound files.

Coincident with the design of these services has been the development of applications for implementing the services on the client/server architecture. Accordingly, applications are available for users to obtain files from computers connected to the Internet using the FTP protocol. Similarly, individual applications allow users to log into remote computers (as though they were logging in from terminals attached to those computers) using the Telnet protocol and, further, to view JPEG images and MPEG movies. As a result, there exists a proliferation of applications directed to user activity on the Internet.

A problem with this vast collection of application-specific protocols is that these applications are generally unorganized, thus requiring users to plod through them in order to satisfyingly, and profitably, utilize the Internet. Such lack of uniformity is time consuming and disorienting to users that want to access particular types of information but are forced to use unfamiliar applications. Because of the enormous amount of different types of information available on the Internet and the variety of applications needed to access those information types, the experience of using the Internet may be burdensome to these users.

An alternative to the assortment of open applications for accessing information on the Internet is a "closed" application system, such as Prodigy, CompuServe or America Online. Each of these systems provide a full range of well-organized services to their subscribers; however, they also impose restrictions on the services developers can offer for their systems. Such constraint of "new" service development may be an unreasonable alternative for many users.

Two fashionable services for accessing information over the Internet are Gopher and the World-Wide Web ("Web"). Gopher consists of a series of Internet servers that provide a "list-oriented" interface to information available on the networks; the information is displayed as menu items in a hierarchical manner. Included in the hierarchy of menus are documents, which can be displayed or saved, and searchable indexes, which allow users to type keywords and perform searches.

Some of the menu items displayed by Gopher are links to information available on other servers located on the networks. In this case, the user is presented with a list of available information documents that can be opened. The opened documents may display additional lists or they may contain various data-types, such as pictures or text; occasionally, the opened documents may "transport" the user to another computer on the Internet.

The other popular information service on the Internet is the Web. Instead of providing a user with a hierarchical list-oriented view of information, the Web provides the user with a "linked-hypertext" view. Metaphorically, the Web perceives the Internet as a vast book of pages, each of which may contain pictures, text, sound, movies or various other types of data in the form of documents. Web documents are written in HyperText Markup Language (HTML) and Web servers transfer HTML documents to each other through the HyperText Transfer Protocol (HTTP).

The Web service is essentially a means for naming sources of information on the Internet. Armed with such a general naming convention that spans the entire network system, developers are able to build information servers that potentially any user can access. Accordingly, Gopher servers, HTTP servers, FTP servers, and E-mail servers have been developed for the Web. Moreover, the naming convention enables users to identify resources (such as directories and documents) on any of these servers connected to the Internet and allow access to those resources.

As an example, a user "traverses" the Web by following hot items of a page displayed on a graphical Web browser. These hot items are hypertext links whose presence are indicated on the page by visual cues, e.g., underlined words, icons or buttons. When a user follows a link (usually by clicking on the cue with a mouse), the browser displays the target pointed to by the link which, in some cases, may be another HTML document.

The Gopher and Web information services represent entirely different approaches to interacting with information on the Internet. One follows a list-approach to information that "looks" like a telephone directory service, while the other assumes a page-approach analogous to a tabloid newspaper. However, both of these approaches include applications for enabling users to browse information available on Internet servers. For example, TurboGopher is a text-based browser application for client computers operating in accordance with the Gopher protocol. Additionally, each of these applications has a unique way of viewing and accessing the information on server computers.

Typically, a computer includes an operating system and application software which, collectively, control the operations of the computer. The applications are preferably task-specific and independent, e.g., a word processor application edits text, a drawing application edits drawings and a database application interacts with information stored on a database storage unit. Although a user can move data from one application to the other, such as by copying a drawing into a word processing file, the independent applications must be invoked to thereafter manipulate that data. This is primarily because the applications are designed as monolithic, autonomous modules that generally do not interact efficiently.

Netscape Navigator™ ("Netscape") is an example of a monolithic Web browser application that is configured to interact with many of the previously-described protocols, including HTTP, Gopher and FTP. However when instructed to invoke an application that uses one of these protocols, Netscape "translates" the protocol to hypertext. Such awkward translation places the user farther away from the protocol designed to run the application and, in some cases, actually thwarts the user's Internet experience. For example, a discussion system requiring an interactive exchange between participants may be bogged down by hypertext translations.

The Gopher and Web services may further require additional applications to perform specific functions, such as playing sound or viewing movies, with respect to the data types contained in the documents. For example, Netscape employs helper applications for executing application programs having data formats it does not "understand". Execution of these functions on a computer requires interruption of processing and context switching (i.e., saving of state) prior to invoking the appropriate application. Thus, if a user operating within the Netscape application "opens" a MPEG movie, that browsing application must be saved (e.g., to disk) prior to opening an appropriate MPEG application, e.g., Sparkle, to view the image. Such an arrangement is inefficient and rather disruptive to processing operations of the computer.

Generally, the application program presents information to a user through a window of a graphical user interface by drawing images, graphics or text within the window region. The user, in turn, communicates with the application by "pointing" at graphical objects in the window with a pointer that is controlled by a hand-operated pointing device, such as a mouse, or by pressing keys of a keyboard.

The graphical objects typically included with each window region are sizing boxes, buttons and scroll bars. These objects represent user interface elements that the user can point at with the pointer (or a cursor) to select or manipulate. For example, the user may manipulate these elements to move the windows around on the display screen, and change their sizes and appearances so as to arrange the window in a convenient manner. When the elements are selected or manipulated, the underlying application program is informed, via the window environment, that control has been appropriated by the user.

A menu bar is a further example of a user interface element that provides a list of menus available to a user. Each menu, in turn, provides a list of command options that can be selected merely by pointing to them with the mouse-controlled pointer. That is, the commands may be issued by actuating the mouse to move the pointer onto or near the command selection, and pressing and quickly releasing, i.e., "clicking" a button on the mouse.

Command options in the menus typically act on one or more objects. If an application requires more information to carry out a command, a dialog box may be employed. A dialog box is a special type of window that elicits information from the user, such as requiring the user to check items or fill in the blanks, typically through the use of a graphical object that the user can manipulate with the mouse. Such an object is called a control and, by manipulating the control, the user can take an immediate action or change a setting to modify a future action. A modal dialog box requires that the user respond to the elicitation prior to performing other actions.

In contrast to this typical application-based computing environment, a software component architecture provides a modular document-based computing arrangement using tools such as viewing editors. The key to document-based computing is the compound document, i.e., a document composed of many different types of data sharing the same file. The types of data contained in a compound document may range from text, tables and graphics to video and sound. Several editors, each designed to handle a particular data type or format, can work on the contents of the document at the same time, unlike the application-based computing environment.

Since many editors may work together on the same document, the compound document is apportioned into individual modules of content for manipulation by the editors. The compound-nature of the document is realized by embedding these modules within each other to create a document having a mixture of data types. The software component architecture provides the foundation for assembling documents of differing contents and the present invention is directed to a system for extending this capability to network-oriented services.

Therefore, it is among the objects of the present invention to simplify a user's experience on computer networks without sacrificing the flexibility afforded the user by employing existing protocols and data types available on those networks.

Another object of the invention is to provide a system for users to open asynchronous information and to monitor and display the progress of the opening process.

Still another object of the invention is to provide a document-based computing system that enables users to replace and extend modules configured to provide services directed to information available on computer networks.

Yet another object of the invention is to provide a framework that allows third-party developers to extend a layered network component system by building new components that seamlessly interact with the system components.

SUMMARY OF THE INVENTION

Briefly, the invention comprises extensible and replaceable network-oriented component system that provides a framework for developing network opener parts that operate on a variety of hardware and software computer systems. These opener parts include key integrating components along with components, such as Gopher-specific and Web-specific components, configured to deliver conventional services directed to computer networks. Communication among these components is achieved through novel application programming interfaces (APIs) to facilitate integration with an underlying software component architecture. Such a highly-modular cooperating layered-arrangement between the network component system and the component architecture allows any existing component to be replaced, and allows new components to be added, without affecting operation of the novel network component system.

According to one aspect of the present invention, the novel system provides an opening part defined by a network component layer that allows asynchronous information to be "opened" by maintaining a placeholder for the asynchronous information until an actual data type determination is made. The asynchronous information is generated by an asynchronous process. The asynchronous process is a potentially time consuming process that is performed in a separate thread from the process that initiated it. The initiating process starts the asynchronous process and does not wait for the process to complete before continuing. When the actual data type of the asynchronous information is determined, an appropriate display part for the actual data type can then be opened. Because it is often necessary and desirable to monitor information status before the actual data type for the asynchronous information is determined, this novel opening part further allows the information to be monitored immediately by creating a transient opening part that monitors and displays progress and status of the process until the actual data type is determined. Accordingly, this transient opening part substantially functions as a placeholder for monitoring and displaying progress until the appropriate display part is opened for the actual data type.

According to another aspect of the present invention, the novel system creates the transient opening part in response to asynchronous information being opened. The transient opening part is used as a substitute for the appropriate display part corresponding to the actual data type during the opening process until the actual data type corresponding to the asynchronous information is determined. When the opening process determines the actual data type for the asynchronous information, the appropriate display part for the actual data type replaces the transient opening part. Accordingly, the appropriate display part displays the additional information as soon as the actual data type is determined while the transient opening part functioning as a placeholder provides the progress and status information until this determination is made.

In accordance with another aspect of this invention, the opening part is capable of monitoring and displaying progress to the user during asynchronous operations. This is accomplished because the opening part is a progress part. A progress broadcaster object and a progress receiver object are two classes of objects that assist the progress part in monitoring and displaying progress. As a result, the opening part displays the progress of the asynchronous operations.

In accordance with another aspect of the invention, the component system is preferably embodied as a customized framework having a set of interconnected abstract classes for defining network-oriented objects. These abstract classes include CyberItem, CyberStream and CyberExtension, and the objects they define are used to build the novel opener components. Interactions among these latter components and existing components of the underlying software architecture provide the basis for the extensibility and replaceability features of the network component system.

Specifically, CyberItem is an object abstraction which represents a "resource on a computer network", but which may be further expanded to include resources available at any accessible location. CyberStream is an object abstraction representing a method for downloading information from a remote location on the computer network, while CyberExtension represents additional behaviors provided to the existing components for integration with the network component system.

The novel network system captures the essence of a "component-based" approach to opening network-oriented information as opposed to the monolithic application-based approach of prior opening systems. Such a component-based system has a number of advantages. First, if a user does not like the way a particular opening part operates, that component can be replaced with a different component provided by another developer. In contrast, if a user does not like the way a monolithic application handles certain protocols, the only recourse is to use another service because the user cannot modify the application to perform the protocol functions in a different manner. Moreover, the opening part may be efficiently extended, replaced and modified within the network component system. For example, if a user does not like the predetermined limit or the visual appearance imposed by the novel opening part, this component may be replaced with another opening part. Clearly, the replaceability feature of the novel network component system provides a flexible alternative to the user.

Second, the use of components is substantially less disruptive than using helper applications in situations where a monolithic application confronts differing data types and formats. Instead of "switching" application layers, the novel network system merely invokes the appropriate component and component viewing editor configured to operate with the data type and format. Such "seamless" integration among components is a significant feature of the modular cooperating architecture described herein.

A third advantage of the novel network system is directed to the cooperating relationship between the system and the underlying software component architecture. Specifically, the novel network components are based on the component architecture technology to therefore ensure cooperation between all components in an integrated manner. The software component architecture is configured to operate on a plurality of computers, and is preferably implemented as a software layer adjoining the operating system. In contrast, data handlers being presently used are typically directed to closed systems situations where all of the data types are known or the data types may be identified immediately or it is not necessary to know the data types immediately. The component architecture technology and the place holding function of the novel opening part solves the problem of handling asynchronous information in a general way for any data handler and is extendible and replaceable with other types of opening parts if desired.

BRIEF DESCRIPTION OF THE DRAWINGS

The above and further advantages of the invention may be better understood by referring to the following description in conjunction with the accompanying drawings in which.

DETAILED DESCRIPTION OF ILLUSTRATIVE EMBODIMENT

Figure 1:
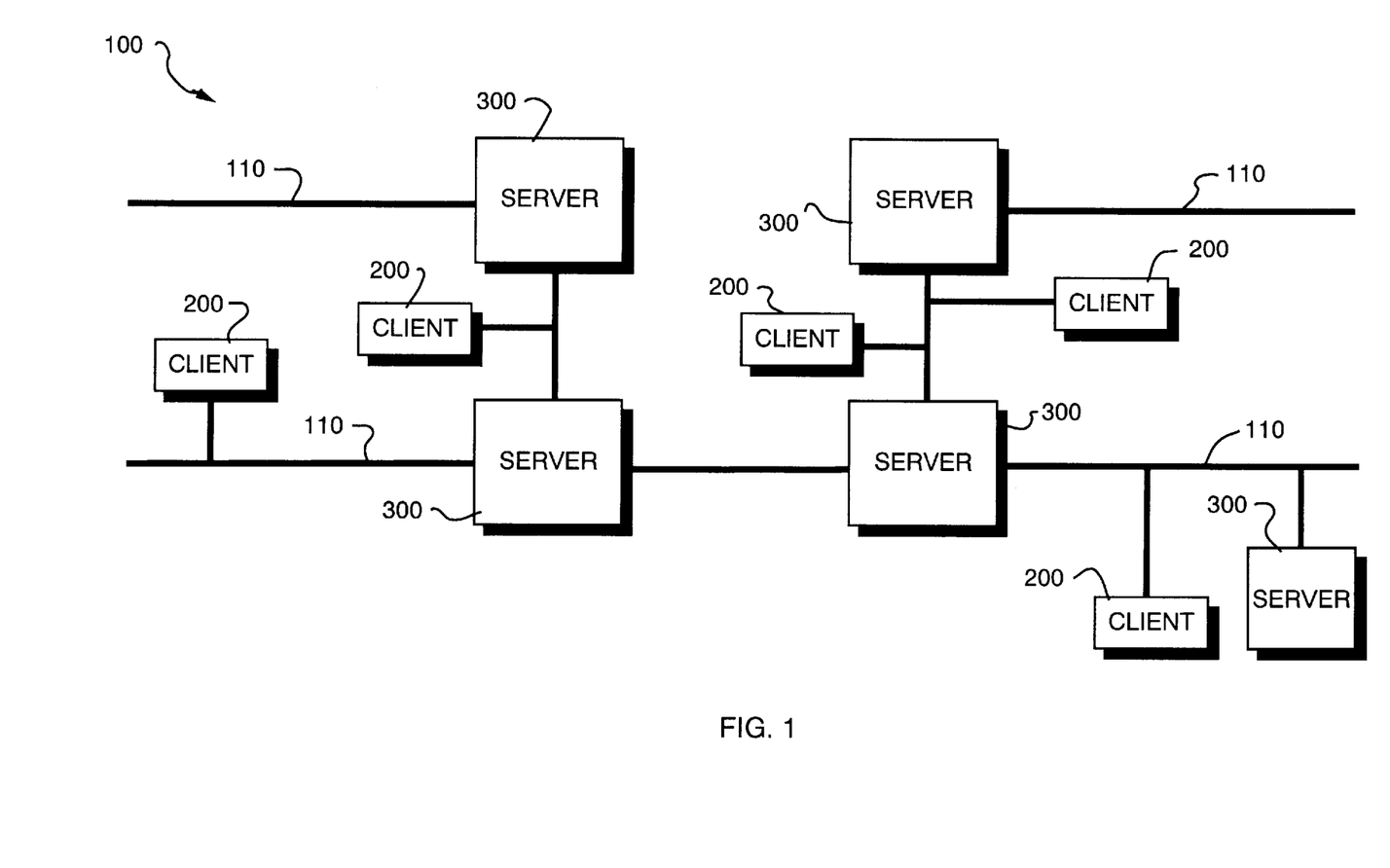
FIG. 1 is a block diagram of a network system including a collection of computer networks interconnected by client and server computers.

FIG. 1 is a block diagram of a network system 100 comprising a collection of computer networks 110 interconnected by client computers ("clients") 200, e.g., workstations or personal computers, and server computers ("servers") 300. The servers are typically computers having hardware and software elements that provide resources or services for use by the clients 200 to increase the efficiency of their operations. It will be understood to those skilled in the art that, in an alternate embodiment, the client and server may exist on the same computer; however, for the illustrative embodiment described herein, the client and server are separate computers.

Several types of computer networks 110, including local area networks (LANs) and wide area networks (WANs), may be employed in the system 100. A LAN is a limited area network that typically consists of a transmission medium, such as coaxial cable or twisted pair, while a WAN may be a public or private telecommunications facility that interconnects computers widely dispersed. In the illustrative embodiment, the network system 100 is the Internet system of geographically distributed computer networks.

Computers coupled to the Internet typically communicate by exchanging discrete packets of information according to predefined networking protocols. Execution of these networking protocols allow users to interact and share information across the networks. As an illustration, in response to a user's request for a particular service, the client 200 sends an appropriate information packet to the server 300, which performs the service and returns a result back to the client 200.

Figure 2:
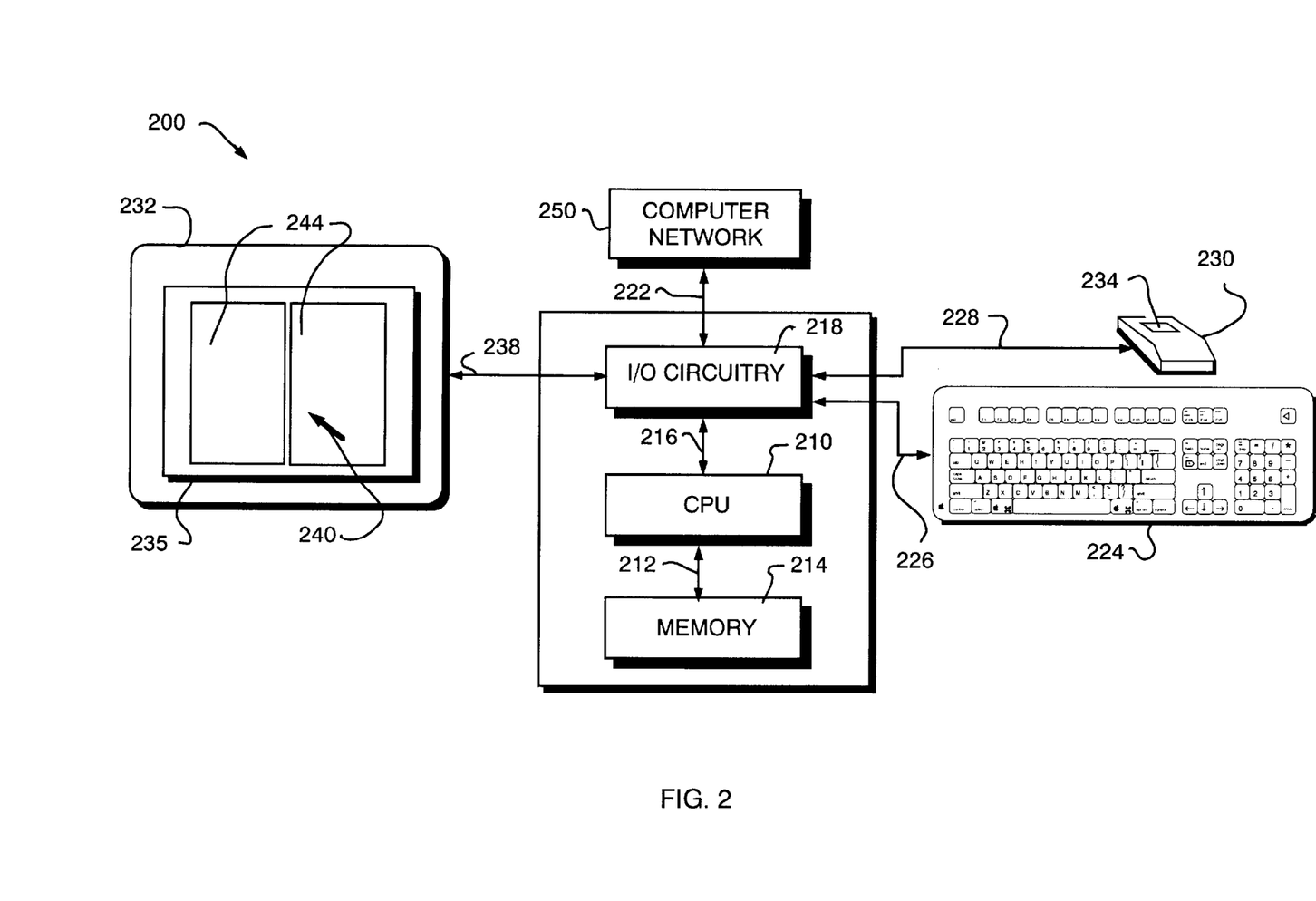
FIG. 2 is a block diagram of a client computer, such as a personal computer, on which the invention may advantageously operate.

FIG. 2 illustrates a typical hardware configuration of a client 200 comprising a central processing unit (CPU) 210 coupled between a memory 214 and input/output (I/O) circuitry 218 by bidirectional buses 212 and 216. The memory 214 typically comprises random access memory (RAM) for temporary storage of information and read only memory (ROM) for permanent storage of the computer's configuration and 25 basic operating commands, such as portions of an operating system (not shown). As described further herein, the operating system controls the operations of the CPU 210 and client computer 200.

The I/O circuitry 218, in turn, connects the computer to computer networks, such as the Internet computer networks 250, via a bidirectional bus 222 and to cursor/pointer control devices, such as a keyboard 224 (via cable 226) and a mouse 230 (via cable 228). The mouse 230 typically contains at least one button 234 operated by a user of the computer. A conventional display monitor 232 having a display screen 235 is also connected to I/O circuitry 218 via cable 238. A pointer (cursor) 240 is displayed on windows 244 of the screen 235 and its position is controllable via the mouse 230 or the keyboard 224, as is well-known. Typically, the I/O circuitry 218 receives information, such as control and data signals, from the mouse 230 and keyboard 224, and provides that information to the CPU 210 for display on the screen 235 or, as described further herein, for transfer over the Internet computer networks 250.

Figure 3:
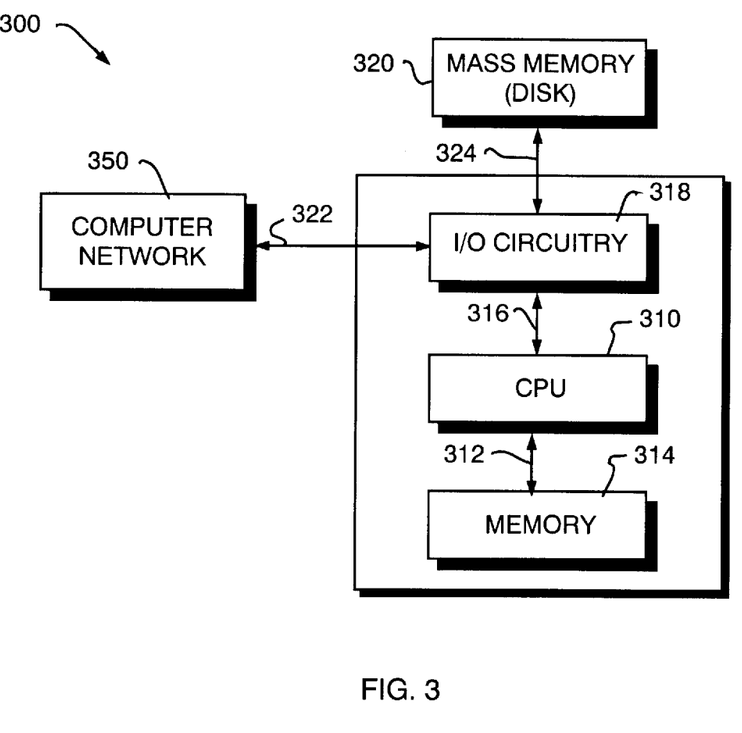
FIG. 3 is a block diagram of a server computer of FIG. 1.

FIG. 3 illustrates a typical hardware configuration of a server 300 of the network system 100. The server 300 has many of the same units as employed in the client 200, including a CPU 310, a memory 314, and I/O circuitry 318, each of which are interconnected by bidirectional buses 312 and 316. Also, the I/O circuitry 318 connects the computer to computer networks 350 via a bidirectional bus 322. These units are configured to perform functions similar to those provided by their corresponding units in the computer 200. In addition, the server typically includes a mass storage unit 320, such as a disk drive, connected to the I/O circuitry 318 via bi-directional bus 324.

It is to be understood that the I/O circuits within the computers 200 and 300 contain the necessary hardware, e.g., buffers and adapters, needed to interface with the control devices, the display monitor, the mass storage unit and the networks. Moreover, the operating system includes the necessary software drivers to control, e.g., network adapters within the I/O circuits when performing I/O operations, such as the transfer of data packets between the client 200 and server 300.

The computers are preferably personal computers of the Macintosh® series of computers sold by Apple Computer Inc., although the invention may also be practiced in the context of other types of computers, including the IBM® series of computers sold by International Business Machines Corp. These computers have resident thereon, and are controlled and coordinated by, operating system software, such as the Apple® System 7®, IBM OS2®, or the Microsoft® Windows® operating systems.

Figure 4:
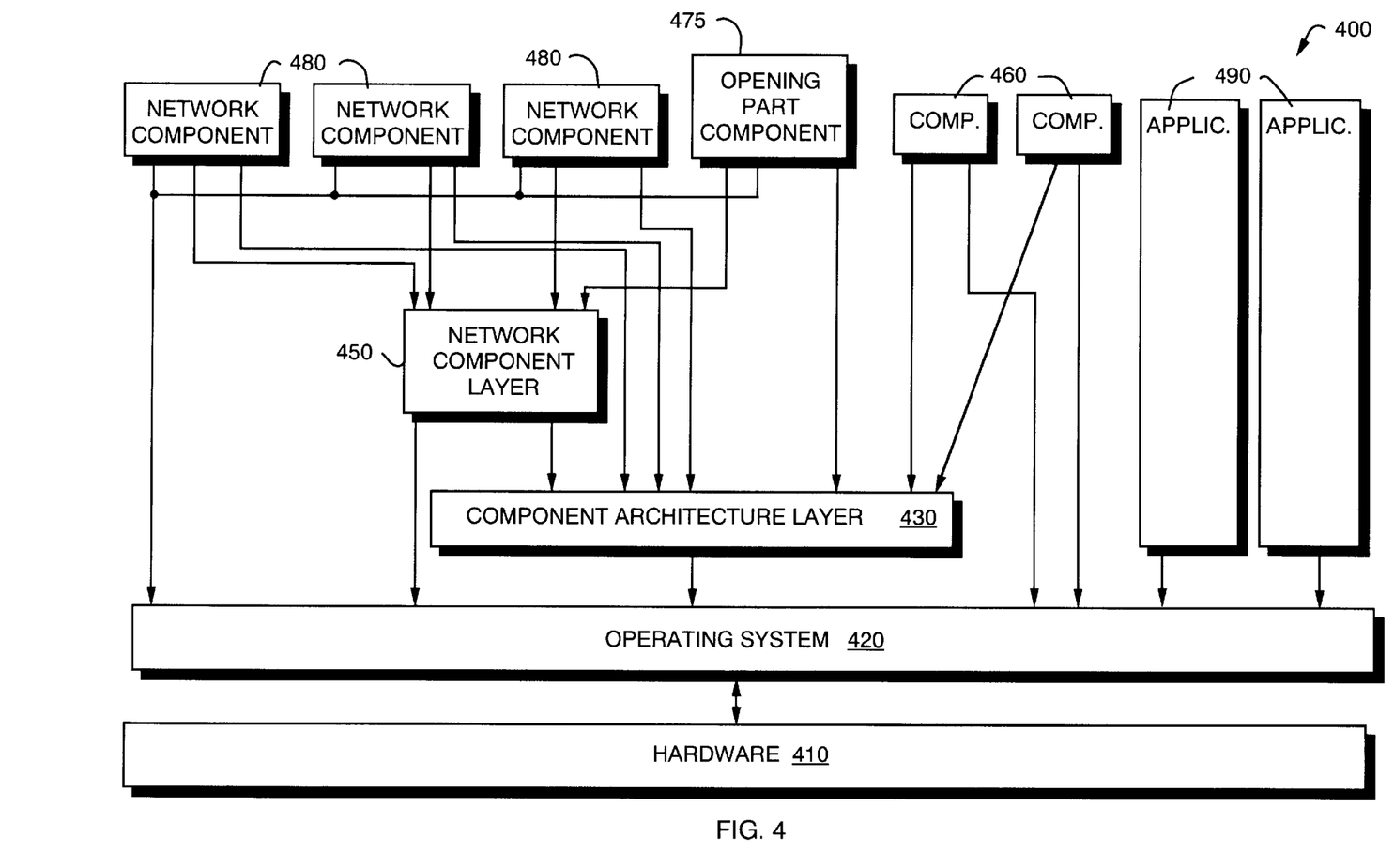
FIG. 4 is a highly schematized block diagram of a layered component computing arrangement in accordance with the invention.

As noted, the present invention is based on a modular document computing arrangement as provided by an underlying software component architecture, rather than the typical application-based environment of prior computing systems. FIG. 4 is a highly schematized diagram of the hardware and software elements of a layered component computing arrangement 400 that includes the novel network-oriented component system of the invention. At the lowest level there is the computer hardware, shown as layer 410. Interfacing with the hardware is a conventional operating system layer 420 that includes a window manager, a graphic system, a file system and network-specific interfacing, such as a TCP/IP protocol stack and an Appletalk protocol stack.

The software component architecture is preferably implemented as a component architecture layer 430. Although it is shown as overlaying the operating system 420, the component architecture layer 430 is actually independent of the operating system 420 and, more precisely, resides side-by-side with the operating system 420. This relationship allows the component architecture to exist on multiple platforms that employ different operating systems.

In accordance with the present invention, a novel network-oriented component layer 450 contains the underlying technology for implementing the extensible and replaceable network component system having an opening part component 475 that acts as a placeholder and displays progress during an asynchronous-event when navigating computer networks, such as the Internet. As described further herein, this technology includes novel application programming interfaces (API) that facilitates integration with the underlying component architecture layer 430 and allows the opening part component 475 to be replaced, extended or modified by other opening-type components. The novel API is preferably delivered in the form of objects in a class hierarchy.

It should be noted that the network component layer 450 may operate with any existing system-wide component architecture, such as the Object Linking and Embedding (OLE) architecture developed by the Microsoft Corporation; however, in the illustrative embodiment, the component architecture is preferably OpenDoc, the vendor-neutral, open standard for facilitating the construction and sharing of compound documents developed by, among others, Apple Computer, Inc.

Using tools such as viewing editors, the component architecture layer 430 creates a compound document composed of data having different types and formats. Each differing data type and format is contained in a fundamental unit called a computing part or, more generally, a "component" 460 comprised of a viewing editor along with the data content. An example of the computing component 460 may include a MacDraw component. The component editor, on the other hand, is analogous to an application program in a conventional computer. That is, the editor is a software component which provides the necessary functionality to display a component's contents and, where appropriate, present a user interface for modifying those contents. Additionally, the editor may include menus, controls and other user interface elements.

The network component layer 450 extends the functionality of the underlying component architecture layer 430 by defining key integrating network-oriented components 480, such as the opening part component 475. As noted, a feature of the invention is the ability to easily extend, replace or modify the opening part component 475 of the layered computing arrangement 400 with a different opening part-type component to provide a user with a customized network-related service offering. This feature is made possible by the cooperating relationship between the network component layer 450 and its underlying component architecture layer 430. For example, the components may include FTP-specific components for transferring files across the networks, Telnet-specific components for remotely logging onto other computers, and JPEG-specific and MPEG-specific components for viewing image and movie data types and formats. The integrating components communicate and interact with these various components of the system in a "seamlessly integrated" manner to provide basic tools for navigating the Internet computer networks.

FIG. 4 also illustrates the relationship of applications 490 to the elements of the layered computing arrangement 400. Although they reside in the same "user space" as the components 460 and network components 480, the applications 490 do not interact with these elements and, thus, interface directly to the operating system layer 420. Because they are designed as monolithic, autonomous modules, applications (such as previous Internet browsers) often do not even interact among themselves. In contrast, the components of the arrangement 400 are designed to work together via the common component architecture layer 430 or, in the case of the network components, via the novel network component layer 450.

Specifically, the invention features the provision of the extensible and replaceable network-oriented component system which, when invoked, causes actions to take place that enhance the ability of a user to interact with the computer to obtain information available over computer networks such as the Internet. The information is manifested to a user via a window environment, such as the graphical user interface provided by System 7 or Windows, that is preferably displayed on the screen 235 (FIG. 2) as a graphical display to facilitate interactions between the user and the computer, such as the client 200. This behavior of the system is brought about by the interaction of the network components with a series of system software routines associated with the operating system 420. These system routines, in turn, interact with the component architecture layer 430 to create the windows and graphical user interface elements, as described further herein.

The window environment is generally part of the operating system software that includes a collection of utility programs for controlling the operation of the computer 200. The operating system 420, in turn, interacts with the components to provide higher level functionality, including a direct interface with the user. A component makes use of operating system functions by issuing a series of task commands to the operating system via the network component layer 450 or, as is typically the case, through the component architecture layer 430. The operating system 420 then performs the requested task. For example, the component may request that a software driver of the operating system initiate transfer of a data packet over the networks 250 or that the operating system display certain information on a window for presentation to the user.

Figure 5:
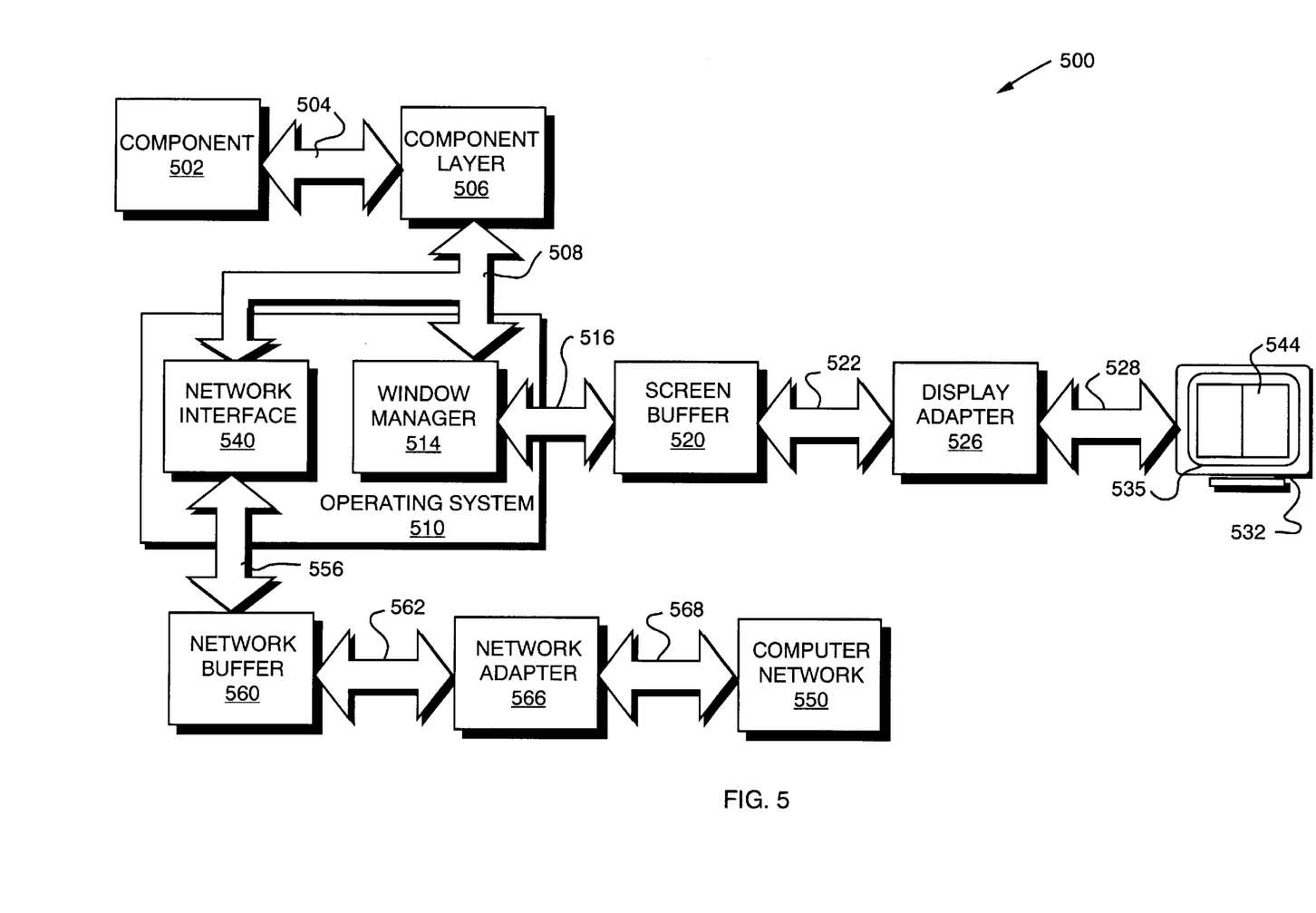
FIG. 5 is a schematic illustration of the interaction of a component, a software component layer and an operating system of the computer of FIG. 2.

FIG. 5 is a schematic illustration of the interaction of a component 502, software component layer 506 and an operating system 510 of a computer 500, which is similar to, and has equivalent elements of, the client computer 200 of FIG. 2. As noted, the network component layer 450 (FIG. 4) is integrated with the component architecture layer 430 to provide a cooperating architecture that allows the novel opening part component 475 to be replaced, extended or modified by other opening-type components; accordingly, for purposes of the present discussion, the layers 430 and 450 may be treated as a single software component layer 506.

The component 502, component layer 506 and operating system 510 interact to control and coordinate the operations of the computer 500 and their interaction is illustrated schematically by arrows 504 and 508. In order to display information on a screen display 535, the component 502 and component layer 506 cooperate to generate and send display commands to a window manager 514 of the operating system 510. The window manager 514 stores information directly (via arrow 516) into a screen buffer 520.

The window manager 514 is a system software routine that is generally responsible for managing windows 544 that the user views during operation of the network component system. That is, it is generally the task of the window manager to keep track of the location and size of the window and window areas which must be drawn and redrawn in connection with the network component system of the present invention.

Under control of various hardware and software in the system, the contents of the screen buffer 520 are read out of the buffer and provided, as indicated schematically by arrow 522, to a display adapter 526. The display adapter 526 contains hardware and software (sometimes in the form of firmware) which converts the information in the screen buffer 520 to a form which can be used to drive a display screen 535 of a monitor 532. The monitor 532 is connected to display adapter 526 by cable 528.

Similarly, in order to transfer information as a packet over the computer networks, the component 502 and component layer 506 cooperate to generate and send network commands, such as remote procedure calls, to a network-specific interface 540 of the operating system 510. The network interface comprises system software routines, such as "stub" procedure software and protocol stacks, that are generally responsible for formatting the information into a predetermined packet format according to the specific network protocol used, e.g., TCP/IP or Apple-talk protocol.

Specifically, the network interface 540 stores the packet directly (via arrow 556) into a network buffer 560. Under control of the hardware and software in the system, the contents of the network buffer 560 are provided, as indicated schematically by arrow 562, to a network adapter 566. The network adapter incorporates the software and hardware, i.e., electrical and mechanical interchange circuits and characteristics, needed to interface with the particular computer networks 550. The adapter 566 is connected to the computer networks 550 by cable 568.

In a preferred embodiment, the invention described herein is implemented in an object-oriented programming (OOP) language, such as C++, using System Object Model (SOM) technology and OOP techniques. The C++ and SOM languages are well-known and many articles and texts are available which describe the languages in detail. In addition, C++ and SOM compilers are commercially available from several vendors. Accordingly, for reasons of clarity, the details of the C++ and SOM languages and the operations of their compilers will not be discussed further in detail herein.

As will be understood by those skilled in the art, OOP techniques involve the definition, creation, use and destruction of "objects". These objects are software entities comprising data elements and routines, or functions, which manipulate the data elements. The data and related functions are treated by the software as an entity that can be created, used and deleted as if it were a single item. Together, the data and functions enable objects to model virtually any real-world entity in terms of its characteristics, which can be represented by the data elements, and its behavior, which can be represented by its data manipulation functions. In this way, objects can model concrete things like computers, while also modeling abstract concepts like numbers or geometrical designs.

Objects are defined by creating "classes" which are not objects themselves, but which act as templates that instruct the compiler how to construct an actual object. A class may, for example, specify the number and type of data variables and the steps involved in the functions which manipulate the data. An object is actually created in the program by means of a special function called a "constructor" which uses the corresponding class definition and additional information, such as arguments provided during object creation, to construct the object. Likewise objects are destroyed by a special function called a "destructor". Objects may be used by manipulating their data and invoking their functions.

The principle benefits of OOP techniques arise out of three basic principles: encapsulation, polymorphism and inheritance. Specifically, objects can be designed to hide, or encapsulate, all, or a portion of, its internal data structure and internal functions. More specifically, during program design, a program developer can define objects in which all or some of the data variables and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions that have the same overall format, but that work with different data, to function differently in order to produce consistent results. Inheritance, on the other hand, allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these functions appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

In accordance with the present invention, the component 502 and windows 544 are "objects" created by the component layer 506 and the window manager 514, respectively, the latter of which may be an object-oriented program. Interaction between a component, component layer and a window manager is illustrated in greater detail in FIG. 6.

Figure 6:
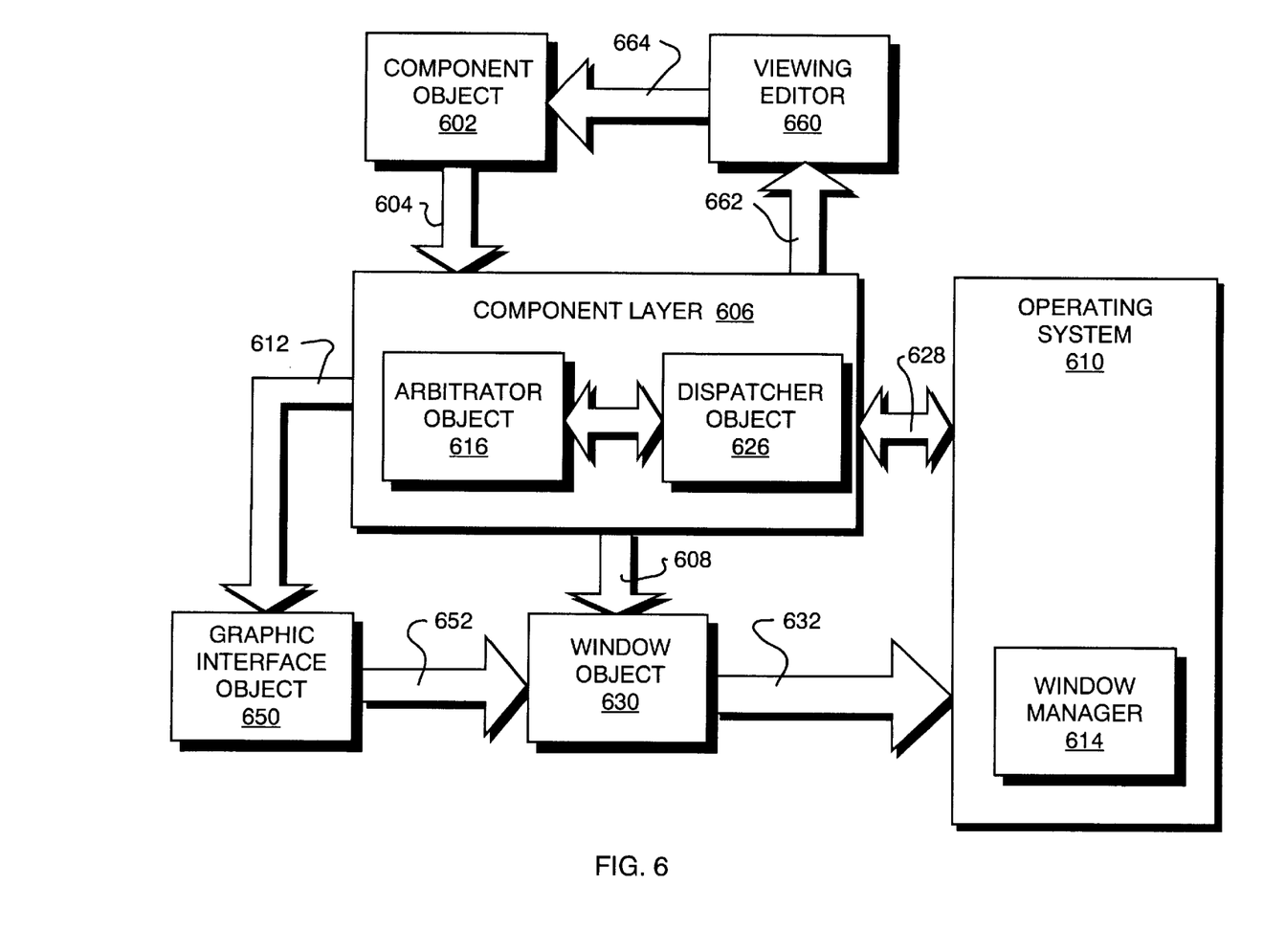
FIG. 6 is a schematic illustration of the interaction between a component, a component layer and a window manager in accordance with the invention.

In general, the component layer 606 interfaces with the window manager 614 by creating and manipulating objects. The window manager 614 itself may be an object which is created when the operating system 610 is started. Specifically, the component layer 606 creates window objects 630 that cause the window manager 614 to create associated windows on the display screen. This is shown schematically by an arrow 608. In addition, the component layer 606 creates individual graphic interface objects 650 that are stored in each window object 630, as shown schematically by arrows 612 and 652. Since many graphic interface objects may be created in order to display many interface elements on the display screen, the window object 630 communicates with the window manager 614 by means of a sequence of drawing commands issued from the window object 630 to the window manager 614, as illustrated by arrow 632.

As noted, the component layer 606 functions to embed components within one another to form a compound document having mixed data types and formats. Many different viewing editors may work together to display, or modify, the data contents of the document. In order to direct keystrokes and mouse events initiated by a user to the proper components and editors, the component layer 606 includes an arbitrator 616 and a dispatcher 626.

The dispatcher 626 is an object that communicates with the operating system 610 to identify the correct viewing editor 660, while the arbitrator 616 is an object that informs the dispatcher as to which editor "owns" the stream of keystrokes or mouse events. Specifically, the dispatcher 626 receives these "human-interface" events from the operating system 610 (as shown schematically by arrow 628), and delivers them to the correct viewing editor 660 via arrow 662. The viewing editor 660 then modifies or displays, either visually or acoustically, the contents of the data types.

Although OOP offers significant improvements over other programming concepts, software development still requires significant outlays of time and effort, especially if no pre-existing software is available for modification. Consequently, a prior art approach has been to provide a developer with a set of predefined, interconnected classes which create a set of objects and additional miscellaneous routines that are all directed to performing commonly-encountered tasks in a particular environment. Such pre-defined classes and libraries are typically called "frameworks" and essentially provide a pre-fabricated structure for a working document.

For example, a framework for a user interface might provide a set of predefined graphic interface objects which create windows, scroll bars, menus, etc. and provide the support and "default" behavior for these interface objects. Since frameworks are based on object-oriented techniques, the predefined classes can be used as base classes and the built-in default behavior can be inherited by developer-defined subclasses and either modified or overridden to allow developers to extend the framework and create customized solutions in a particular area of expertise. This object-oriented approach provides a major advantage over traditional programming since the programmer is not changing the original program, but rather extending the capabilities of that original program. In addition, developers are not blindly working through layers of code because the framework provides architectural guidance and modeling and, at the same time, frees the developers to supply specific actions unique to the problem domain.

There are many kinds of frameworks available, depending on the level of the system involved and the kind of problem to be solved. The types of frameworks range from high-level frameworks that assist in developing a user interface, to lower-level frameworks that provide basic system software services such as communications, printing, file systems support, graphics, etc. Commercial examples of application-type frameworks include MacApp (Apple), Bedrock (Symantec), OWL (Borland), NeXT Step App Kit (NeXT) and Smalltalk-80 MVC (ParcPlace).

While the framework approach utilizes all the principles of encapsulation, polymorphism, and inheritance in the object layer, and is a substantial improvement over other programming techniques, there are difficulties which arise. These difficulties are caused by the fact that it is easy for developers to reuse their own objects, but it is difficult for the developers to use objects generated by other programs. Further, frameworks generally consist of one or more object "layers" on top of a monolithic operating system and even with the flexibility of the object layer, it is still often necessary to directly interact with the underlying system by means of awkward procedure calls.

In the same way that a framework provides the developer with prefab functionality for a document, a system framework, such as that included in the preferred embodiment, can provide a prefab functionality for system level services which developers can modify or override to create customized solutions, thereby avoiding the awkward procedural calls necessary with the prior art frameworks. For example, consider a customizable network interface framework which can provide the foundation for browsing and accessing information over a computer network. A software developer who needed these capabilities would ordinarily have to write specific routines to provide them. To do this with a framework, the developer only needs to supply the characteristic and behavior of the finished output, while the framework provides the actual routines which perform the tasks.

A preferred embodiment takes the concept of frameworks and applies it throughout the entire system, including the document, component, component layer and the operating system. For the commercial or corporate developer, systems integrator, or OEM, this means all of the advantages that have been illustrated for a framework, such as MacApp, can be leveraged not only at the application level for things such as text and graphical user interfaces, but also at the system level for such services as printing, graphics, multi-media, file systems and, as described herein, network-specific operations.

Referring again to FIG. 6, the window object 630 and the graphic interface object 650 are elements of a graphical user interface of a network component system having a customizable framework for greatly enhancing the ability of a user to monitor and display progress and status information during the opening process over a computer network. The novel network system provides a platform for developing opening components for operation on a variety of hardware and software computer systems.

Moreover, the network components are preferably implemented as objects and communication among the network component objects is effected through novel application programming interfaces (APIs). These APIs are preferably delivered in the form of objects in a class hierarchy that is extensible so that developers can create new components and editors. From an implementation viewpoint, the objects can be subclassed and can inherit from base classes to build customized components allow users to see different kinds of data using different kinds of protocols, or to create components that function differently from existing components.

In accordance with the invention, the customized framework has a set of interconnected abstract classes for defining network-oriented navigation objects used to build the customized network components. These abstract classes include CyberItem, CyberStream and CyberExtension and the objects they define are used to build the novel network components. A description of these abstract classes is provided in copending and commonly assigned pending U.S. patent application Ser. No. 08/435,377; titled Extensible, Replaceable Network Component System, filed May 5, 1995, which application is incorporated by reference as though fully set forth herein. Specifically, the CyberItem class defines the item object which interacts with objects defined by the other abstract classes of the network system to efficiently "transport" a user back to a desired network location in response to manipulation of the item object's icon.

Another key class in accordance with the invention that defines the public interface for building customized network components is a CyberDisplay part class. The CyberDisplay part is a part that displays the contents referenced by a CyberItem and is an OpenDoc part with an extension subclassed from CyberExtension. In particular, a CyberDisplay part may use a CyberStream to download data referenced by a CyberItem. CyberDisplay parts are distinguished by the type of data that they may display. For example, a CyberDisplay JPEG part may display JPEG data, regardless of whether the source of the JPEG data is a Gopher server or an HTTP server.

Similar to any OpenDoc part, each CyberDisplay part has associated part kinds that describe the types of data it can display. When a CyberItem needs to create a part to display the content referenced, OpenDoc uses the data kind to determine the appropriate part editor. In a preferred embodiment, MIME media types are used to create corresponding OpenDoc kind strings.

The simplest CyberDisplay parts display content that does not contain links to other content. A JPEG display part is an example of such a part. Other CyberDisplay parts, such as FTP, Gopher and HTML display parts, display content that includes links to other content. By convention, these display parts display themselves by being embedded in a navigator, which is an OpenDoc part that can embed CyberDisplay parts.

Figure 7:
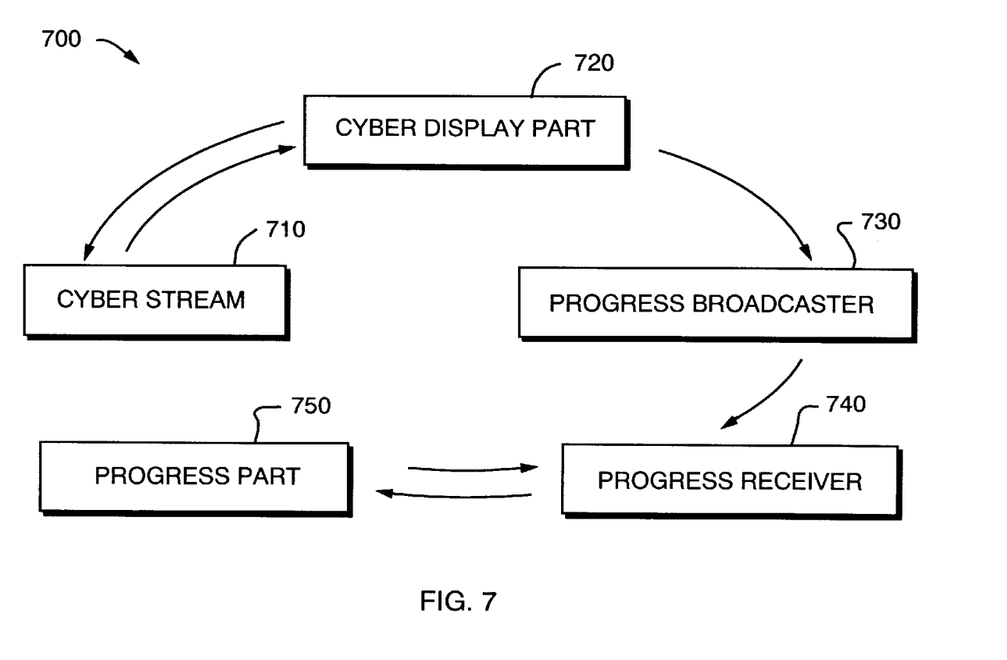
FIG. 7 illustrates a simplified class hierarchy diagram used for monitoring and displaying progress during the opening process in accordance with the invention.

FIG. 7 illustrates a simplified class hierarchy diagram 700 for monitoring and displaying progress during an exemplary opening process for a CyberItem. In this opening process, a CyberDisplay part is called so that the content associated with the CyberItem may be displayed. A CyberStream 710, which is a subclass that encapsulates the protocol knowledge required to download data referenced by objects of its companion CyberItem subclass, is used to provide progress information to a CyberDisplay part 720 and polls the CyberDisplay part 720 for progress information. For example, the progress information may include process mode data, process status data, and data on the percentage of the process that has been completed. A progress broadcaster object 730 and a progress receiver object 740 work in conjunction with a progress part 750 to monitor and display the progress information to a user. For instance, the progress broadcaster object 730 represents an asynchronous process, such as a download operation, and monitors the progress of that operation towards completion.

When the CyberDisplay part 720 initiates an asynchronous process, the progress broadcaster object 730 may also be created to keep track of that process. The progress broadcaster object 730 may further monitor the total amount of work to be performed by the process and the amount of work that has been performed at that time. Typical examples of monitored work include the functions necessary to complete downloading and e-mailing operations. For instance, in downloading operations, the progress broadcaster object 730 may monitor the number of bytes that have been downloaded to a disk and the total number of bytes that are expected to be downloaded.

Figure 8:
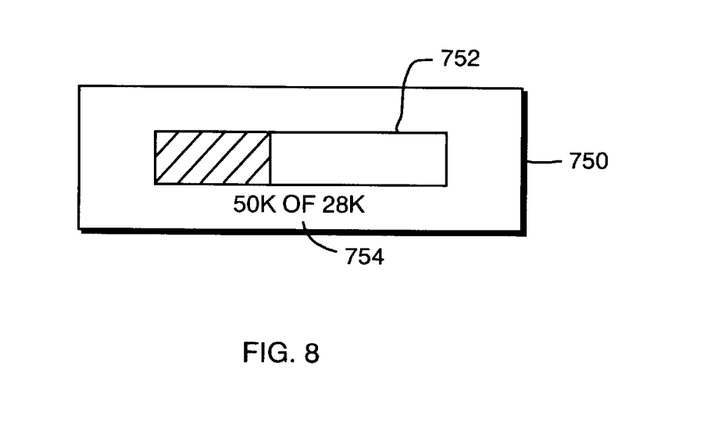
FIG. 8 is an exemplary illustration for a display of the progress part according to the invention.

The CyberDisplay part 720 "attaches" its progress broadcaster object 730 to the progress part 750 so that the progress may be displayed. It is desirable to attach the progress broadcaster object 730 to the CyberDisplay part 720 when any time-consuming operation is initiated. To attach the progress broadcaster object 730, the CyberDisplay part 720 typically is first retrieved and then a CyberExtension object is acquired for the CyberDisplay part 720. Then, an AttachProgressBroadcaster method of the CyberExtension object may be called for completing the attachment of the progress broadcaster object 730 to the CyberDisplay part 720. Referring to FIG. 8 for example, the progress part 750 may display progress information as a bar graph 752 and/or a numerical display 754. The progress part 750 obtains the status and progress information from its associated progress receiver 740 for displaying this information on the GUI to the user.

Figure 9:
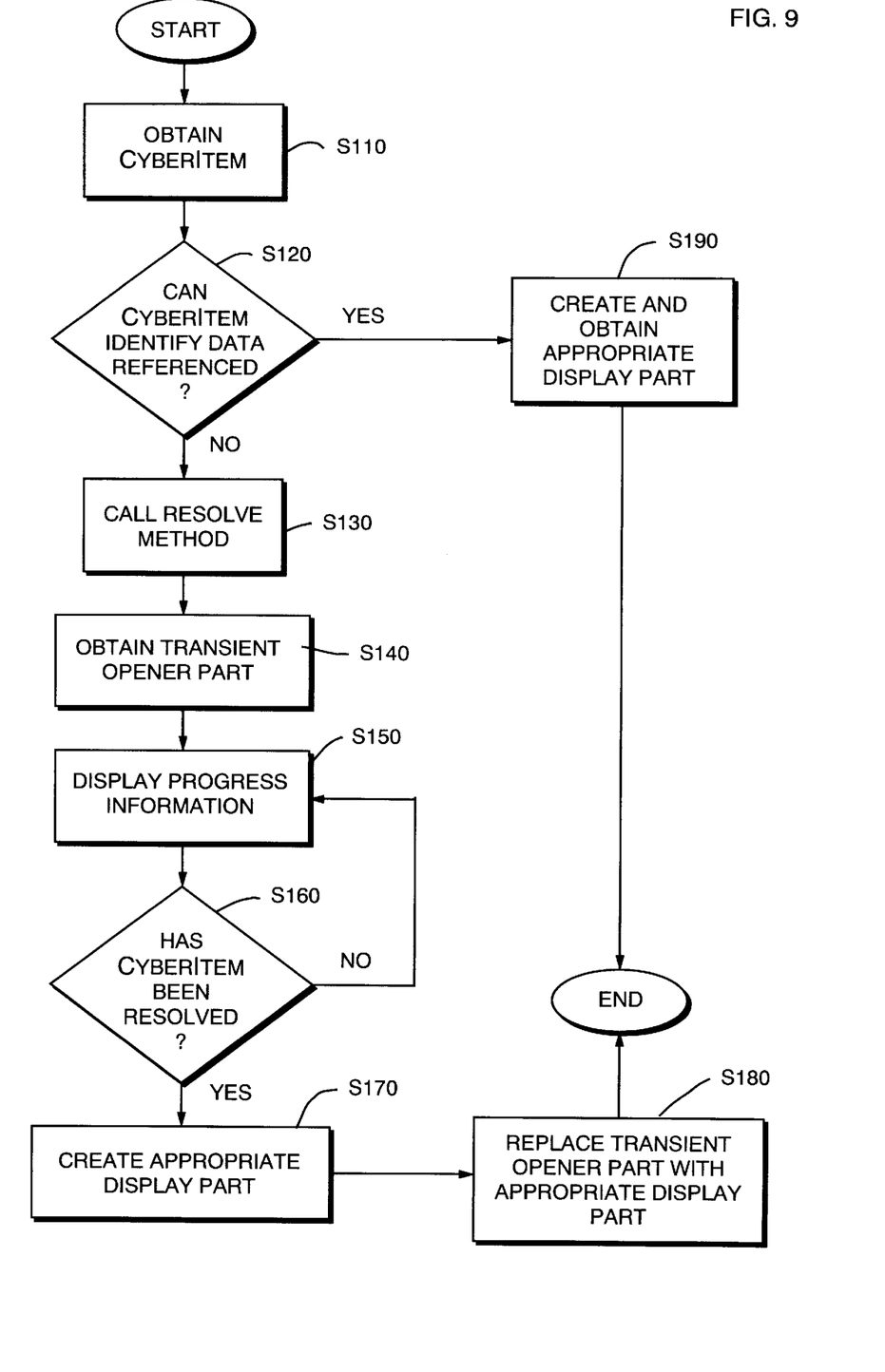
FIG. 9 is a flow chart illustrating the opening process for asynchronous data according to the invention.

An important function of the opening process for the invention is to display progress to the user during an asynchronous process and to create a display part to display data when it is available. FIG. 9 is a flow chart illustrating this function. At step S110, a CyberItem is obtained. An Open method of the CyberItem is responsible for determining the type of data that the CyberItem references. This determining step may also be described as a resolving step. If the CyberItem can immediately identify the data referenced at step S120, an appropriate display part for the identified data is created as indicated at step S190. Thereby, the appropriate CyberDisplay part for the CyberItem is used for displaying the status and progress information to the user for the data and process referenced by the CyberItem.

However, if the CyberItem cannot identify the referenced data at step S120, a Resolve method is called at step S130 since an appropriate display part for the referenced data cannot be created immediately. After calling the Resolve method, a transient opener part is obtained at step S140. This transient opener part is obtained and created to act as a placeholder for the appropriate display part until the actual data type for the referenced data is identified and the actual opener and display parts can be obtained. As indicated in step S150, a progress broadcaster is attached to the transient opener part for displaying progress and status information for the referenced data during this Resolve method. This transient opener part opens in its own window or in an embedded frame for displaying progress during the transient opening process of the Resolve method. Next, it is determined whether or not the data referenced by the CyberItem has been identified or resolved at step S160. If the data is determined as not being resolved at step S160, the process returns to step S150 and continues to display progress information during this Resolve method. If the data is determined to be resolved at step S160, the appropriate display part can then be obtained and created at step S170.

Thereafter, the transient opener part is replaced with the appropriate display part at step S180. Then, the appropriate CyberDisplay part may display additional information for the data and process referenced by the CyberItem.

For a more detailed discussion of the CyberItem opening process, the other processes associated with the novel network component system and the classes and methods associated therewith, the text material *Cyberdog Programmers Kit*, Apple Computer, Inc., July 1996 and *Cyberdog*, Feiler, 1996, may be referred to and both texts are incorporated by reference as though fully set forth herein.

Figure 10:
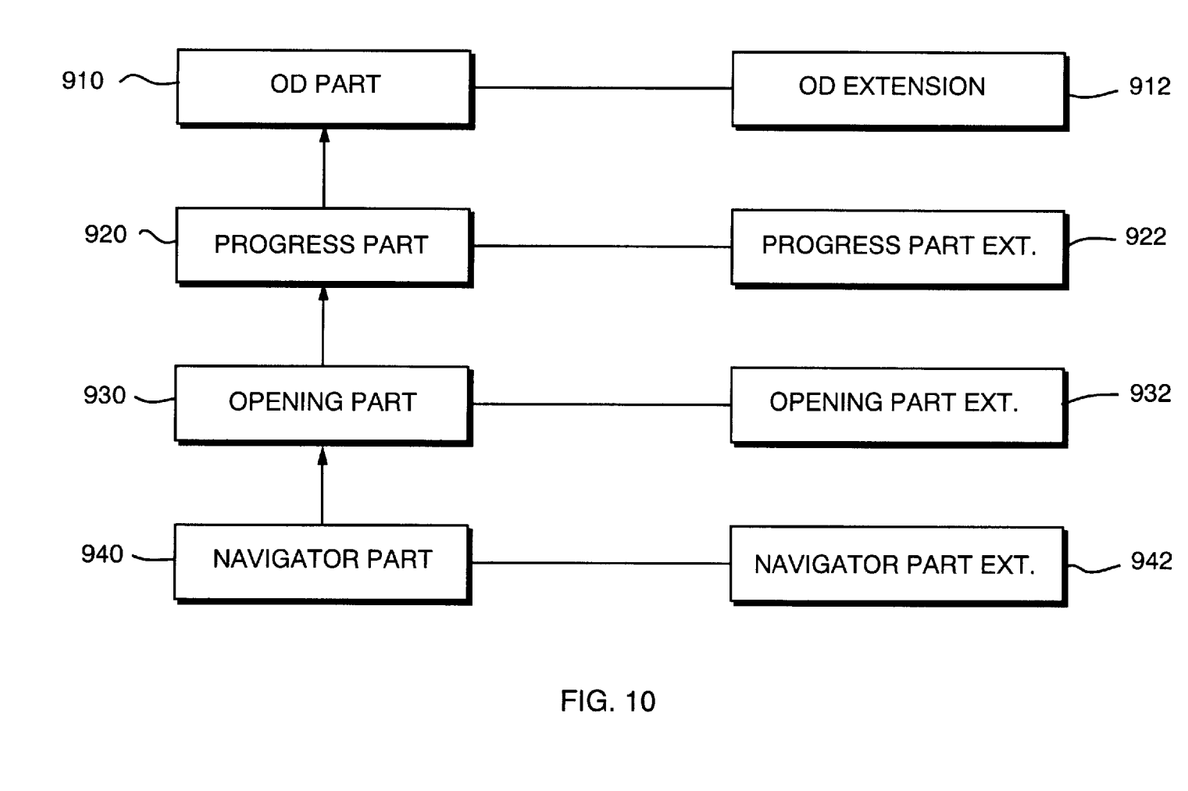
FIG. 10 illustrates a simplified class hierarchy illustrating an abstraction of a OpenDoc Part and its associated extension in accordance with the invention.

FIG. 10 illustrates simplified conceptual entities of an OpenDoc (OD) part 910. As noted, OpenDoc is a multi-platform technology implemented as a set of shared libraries that uses component software to facilitate the construction and sharing of compound documents; it cannot be used in a conventional manner by adding methods to a class, and then, new methods must be added by way of associated "extensions". As illustrated in FIG. 10, part 910 is associated with an extension 912, progress part 920 is associated with a progress part extension 922, an opening part 930 is associated with an opening part extension 932, and a navigator part 940 is associated with a navigator part extension 942. These extension objects may be used to extend the programming interface of another OpenDoc object.

More particularly, these extension objects are the mechanisms for adding functionality to, and extending the APIs of, computing components so that they may communicate with the novel network components. For example, the opening part extension 932 is a subclass of the opening part 930 base class, which defines the generic behaviors of extensions to the computing components and the objects defined by this class are used to build components having the replaceable and extensible behaviors of the novel opening part.

These examples are just a few of the extension classes that can be subclassed and implemented as new methods of their associated part. In practical use, when a part is discussed, the part and extension are both being referred to. However, representation by the two entities is a useful abstraction for reference even though only the part is often referred to in practice.

In summary, the novel network system described herein utilizes a component based approach to opening network oriented asynchronous information as opposed to the monolithic application based approach of conventional data handling systems. In particular, the novel opening part creates a transient opening part that is used as a substitute during the opening process if the data type cannot be determined. When the data type is determined, an appropriate display part for the data type replaces the transient opener part. While the transient opening part is being used, the progress and status of asynchronous operations can be monitored and displayed. The primary purpose of the transient opening part is to bridge the gap between a CyberItem stored in an OpenDoc document and the CyberDisplay part that displays the content referenced by the CyberItem. To bridge this gap, the transient opening part serves as a placeholder in a document until the appropriate display part corresponding to the actual data type can be obtained. As a secondary purpose, the transient opening part displays progress to the user during an asynchronous operation. The CyberItem or the CyberDisplay part that initiates an asynchronous operation can attach a progress broadcaster object to the transient opener part and use the transient opener part to display progress.

While there has been shown and described an illustrative embodiment for implementing an extensible and replaceable asynchronous information opening component of a network component system, it is to be understood that various other adaptations and modifications may be made within the spirit and scope of the invention. For example, additional system software routines may be used when implementing the invention in various applications. These additional system routines include dynamic link libraries (DLL), which are program files containing collections of window environment and networking functions designed to perform specific classes of operations. These functions are invoked as needed by the software component layer to perform the desired operations. Specifically, DLLs, which are generally well-known, may be used to interact with the component layer and window manager to provide network-specific components and functions.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. An extensible and replaceable layered component computing arrangement residing on a computer and coupled to a computer network for opening asynchronous information, the layered arrangement comprising:

a component architecture layer interfacing with an operating system to control the operations of the computer, the component architecture layer defining a plurality of computing components;

a network component layer coupled to the component architecture layer in cooperating relation; and an opening part defined by the network component layer for opening asynchronous information by maintaining a placeholder for the asynchronous information until an actual data type determination is made for the asynchronous information.

2. The layered arrangement of claim 1 wherein the opening part is replaceable and extensible by other opening-type parts in response to the cooperating relationship between the network component layer and the component architecture layer.

3. The layered arrangement of claim 1 wherein the opening part comprises a transient opening part which is replaced with a display part corresponding to the actual data type when the actual data type of the asynchronous information is determined.

4. The layered arrangement of claim 3 wherein the opening part opens a display part corresponding to the actual data type for displaying the asynchronous information when said actual data type is determined.

5. The layered arrangement of claim 1 wherein the opening part is a progress part capable of monitoring and displaying progress of the opening process.

6. The layered arrangement of claim 5 further comprising a progress broadcaster object and a progress receiver object for assisting the progress part in monitoring and displaying progress.

7. The layered arrangement of claim 1 wherein the network component layer comprises application programming interfaces delivered in the form of objects in a class hierarchy.

8. An extensible and replaceable network-oriented component system for opening asynchronous information on computer networks, the system comprising:

a processor;

an operating system;

a component architecture layer interfacing with an operating system to control the operations of the computer, the component architecture layer defining a plurality of computing components;

a network component layer coupled to the component architecture layer in cooperating relation; and an opening part defined by the network component layer for opening asynchronous information by maintaining a placeholder for the asynchronous information until an actual data type determination is made for the asynchronous information.

9. The system of claim 8 wherein the opening part is replaceable and extensible by other opening-type parts in response to the cooperating relationship between the network component layer and the component architecture layer.

10. The system of claim 8 wherein the opening part comprises a transient opening part which is replaced with a display part corresponding to the actual data type when the actual data type of the asynchronous information is determined.

11. The layered arrangement of claim 10 wherein the opening part opens a display part corresponding to the actual data type for displaying the asynchronous information when said actual data type is determined.

12. The layered arrangement of claim 8 wherein the opening part is a progress part capable of monitoring and displaying progress of the opening process.

13. The layered arrangement of claim 12 further comprising a progress broadcaster object and a progress receiver object for assisting the progress part in monitoring and displaying progress.

14. The layered arrangement of claim 8 wherein the network component layer comprises application programming interfaces delivered in the form of objects in a class hierarchy.

15. A method for opening asynchronous information in an extensible and replaceable layered component computing arrangement residing on a computer and coupled to a computer network, comprising the steps of:

interfacing a component architecture layer with an operating system to control the operations of the computer, the component architecture layer defining a plurality of computing components;

coupling a network component layer to the component architecture layer in cooperating relation; and opening asynchronous information with an opening part defined by the network component layer by maintaining a placeholder for the asynchronous information until the data type is determined.

16. A computer network having an extensible and replaceable layered component computing arrangement for opening asynchronous information, the layered arrangement comprising:

means for interfacing a component architecture layer with an operating system to control the operations of the computer, the component architecture layer defining a plurality of computing components;

means for coupling a network component layer to the component architecture layer in cooperating relation; and opening means defined by the network component layer for opening asynchronous information by maintaining a placeholder for the asynchronous information until an actual data type determination is made for the asynchronous information.

17. The computer network of claim 16 wherein said opening means comprises a plurality of opening parts which are replaceable and extensible by other opening-type parts in response to the cooperating relationship between the network component layer and the component architecture layer.

18. The computer network of claim 16 wherein said opening means comprises a transient opening part which is replaced with display means corresponding to the actual data type when the actual data type of the asynchronous information is determined.

19. The computer network of claim 18 wherein said opening means opens said display means which corresponds to the actual data type, for displaying the asynchronous information when said actual data type is determined.

20. The computer network of claim 16 wherein said opening means comprises progress means for monitoring and displaying progress of said opening means.

21. The computer network of claim 20 wherein said opening means further comprises progress broadcasting and receiving means for assisting said progress means in monitoring and displaying progress.

22. The computer network of claim 16 wherein said coupling means comprises application programming interfacing means for delivering interfaces in the form of objects in a class hierarchy.

23. A computer readable medium containing executable program instructions for an extensible and replaceable component program which opens asynchronous network services in a computer network, the executable program instructions comprising the program instructions for:

(a) interfacing a component architecture layer, which defines a plurality of computing components, with an operating system to control operations of the program;

(b) coupling a network component layer to the component architecture layer in cooperating relation; and (c) opening asynchronous network services by maintaining a placeholder defined by the network component layer for the asynchronous network services until the data type of the asynchronous network services is determined.

24. The medium of claim 23 wherein the program instructions for opening asynchronous network services further comprises initially opening the asynchronous network services by said placeholder and then replacing said placeholder with a display part which corresponds to the data type of the asynchronous network services, when the data type is determined.

25. The medium of claim 24 wherein the program instructions for opening asynchronous network services further comprises monitoring and displaying progress of the opening process until the data type is determined.

26. The medium of claim 25 wherein the program instructions for opening asynchronous network services further comprises assisting the monitoring and displaying of progress by progress broadcaster and receiver objects during the opening process.

* * * * *